(12) United States Patent
Pasquale et al.

(10) Patent No.: US 7,308,288 B2
(45) Date of Patent: Dec. 11, 2007

(54) SYSTEM AND METHOD FOR PRIORITIZED INTERFACE DESIGN

(75) Inventors: Theodore Pasquale, Austin, TX (US); Kurt M. Joseph, Austin, TX (US); Scott H. Mills, Arlington, VA (US)

(73) Assignee: SBC Knowledge Ventures, LP., Reno, NV (US)

( * ) Notice: Subject to any disclaimer, the term of this patent is extended or adjusted under 35 U.S.C. 154(b) by 565 days.

(21) Appl. No.: 10/646,631

(22) Filed: Aug. 22, 2003

(65) Prior Publication Data

US 2005/0054384 A1    Mar. 10, 2005

(51) Int. Cl.
*H04Q 7/32* (2006.01)

(52) U.S. Cl. ............... 455/566; 455/550.1; 455/412.1; 455/412.2; 455/575.1; 455/422.1; 455/403; 345/168; 345/169; 345/173; 379/433.01; 379/433.04

(58) Field of Classification Search ........... 455/418, 455/414.1, 566, 550.1, 412.1, 412.2, 575.1, 455/90.3, 422.1, 403, 500, 517, 419, 420, 455/73, 90.2; 345/173, 168, 169; 379/355.02, 379/433.01, 433.04; 710/15–18
See application file for complete search history.

(56) References Cited

U.S. PATENT DOCUMENTS

| 5,774,357 | A |  | 6/1998 | Hoffberg et al. |
| 5,875,108 | A |  | 2/1999 | Hoffberg et al. |
| 5,937,189 | A |  | 8/1999 | Branson et al. |
| 6,125,287 | A | * | 9/2000 | Cushman et al. ............ 455/566 |
| 6,449,660 | B1 |  | 9/2002 | Berg et al. |
| 6,513,152 | B1 |  | 1/2003 | Branson et al. |
| 6,766,017 | B1 | * | 7/2004 | Yang ...................... 379/355.02 |
| 6,961,590 | B1 | * | 11/2005 | Toebes ........................ 455/564 |
| 2003/0040850 | A1 | * | 2/2003 | Najmi et al. .................... 701/1 |
| 2004/0043758 | A1 | * | 3/2004 | Sorvari et al. ........... 455/414.1 |
| 2004/0198431 | A1 | * | 10/2004 | Yamagishi et al. ...... 455/556.1 |
| 2005/0054384 | A1 |  | 3/2005 | Pasquale et al. |

* cited by examiner

*Primary Examiner*—Keith Ferguson
(74) *Attorney, Agent, or Firm*—Toler Schaffer, LLP

(57) ABSTRACT

A system and method for prioritized interface design are disclosed. In one embodiment of a system incorporating teachings of the present disclosure, a wireless-enabled device may include a display, a user input mechanism, and a housing component that at least partially defines an internal cavity. The device may have several engines including a display engine that can initiate presentation of a menu that has several selectable items displayed in respective menu positions. The device may also include a metric engine that tracks some selection metric for the selectable items and a priority engine that determines a prioritization level for the selectable items. In some embodiments, the prioritization level may be related to a selection metric. The device may also have a mapping engine that modifies assigned menu positions for the selectable items in response to changes in the prioritization level of the items.

18 Claims, 3 Drawing Sheets

SYSTEM AND METHOD FOR PRIORITIZED INTERFACE DESIGN

FIELD OF THE DISCLOSURE

The present disclosure relates to user interfaces, and more particularly to a system and method for prioritized interface design.

BACKGROUND OF THE DISCLOSURE

In recent years, wireless-enabled electronic devices have become more pervasive. Historically, wireless capability may have been the near-exclusive domain of wireless telephones and pagers, but the category of wireless-enabled devices has grown to include several different device types including Personal Digital Assistants (PDAs), gaming devices, audio players, video players, and more.

Many of these devices, from wireless telephones to portable audio players, have also become more feature-rich. With the increased availability of new features, services, and technologies, device use has become more complex and user interface strategy has become more important.

User-interface designers often develop and test many different interfaces in an effort to ensure that device users will be able to easily and quickly navigate through the "laundry list" of available options. The increasingly complex interfaces being developed today face the additional challenge of a relatively small display space. Presenting a single screen with all the available features represented by a unique icon, word or phrase may not be possible.

As such, a need exists for a better interface—one that presents a device user with an easy to use and timely technique for accessing desired features.

BRIEF DESCRIPTION OF THE DRAWINGS

The present invention is pointed out with particularity in the appended claims. However, features are described in the following detailed description in conjunction with the accompanying drawings in which:

DETAILED DESCRIPTION OF THE DRAWINGS

Figure 1:
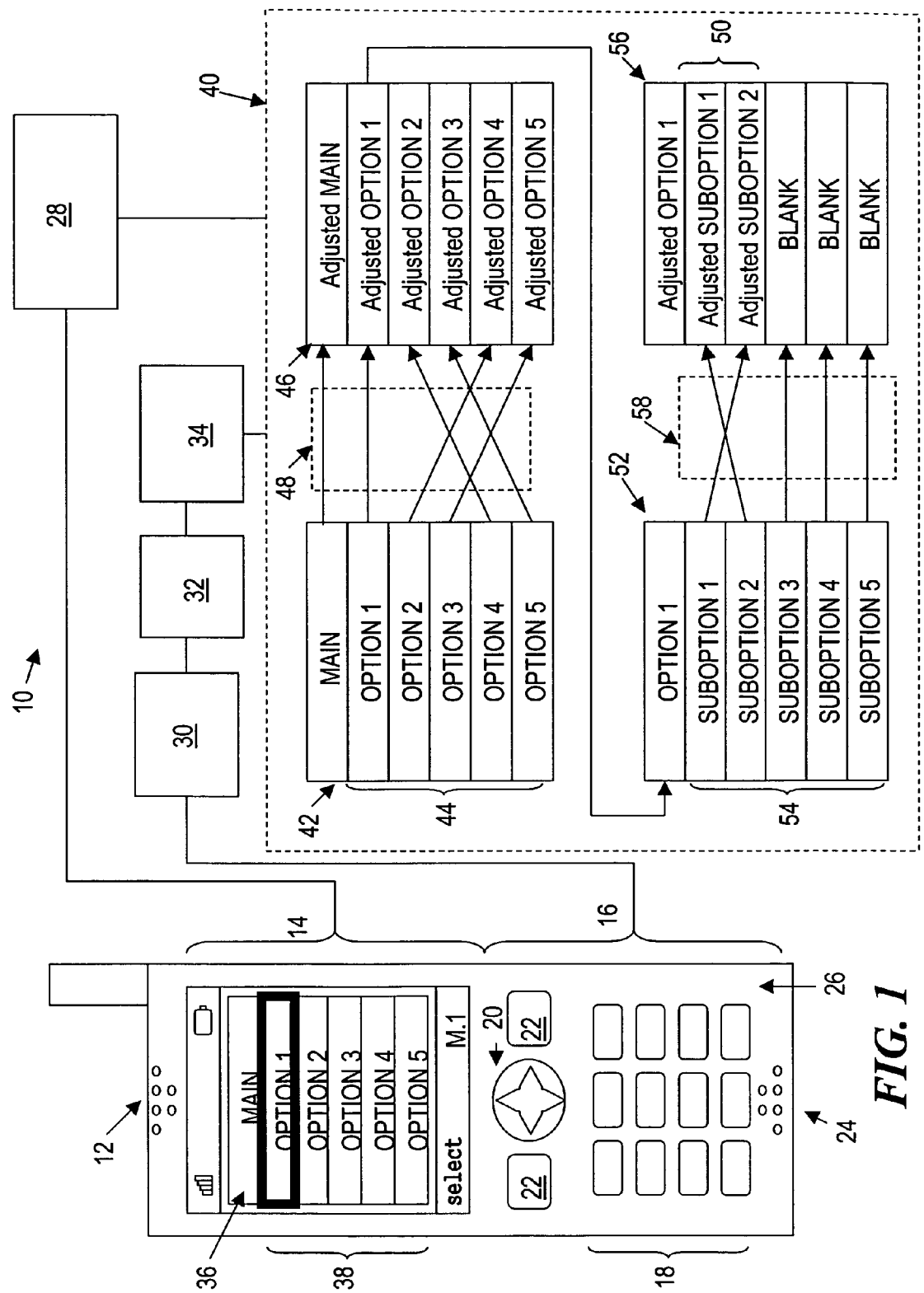
FIG. 1 presents an illustrative diagram of a user interface design system incorporating teachings of the present disclosure.

As mentioned above, electronic devices are becoming increasingly feature-rich. In an effort to make these devices easy to use, interface designers often need to develop and test many different interfaces to find an interface that allows device users to easily and quickly navigate through the "laundry list" of available options. With many devices, especially hand-held wireless-enabled devices, the increasingly complex interfaces being developed today face the additional challenge of a relatively small display space.

To address this display space shortage, a designer may create an interface that has a hierarchical format. The available features and/or selectable options may be grouped into increasingly broad categories so that a main menu screen may only present four or five options, with each of those options including some number of suboptions. The number of levels necessary likely depends on the total number of available options or features to be included in the interface menus.

While this menu and sub-menu structure overcomes some of the challenges presented by small displays, it may also require a user to move through several menu levels before eventually selecting the desired option. As mentioned above, FIG. 1 presents an illustrative diagram of a user interface design system 10 incorporating teachings of the present disclosure In the embodiment of system 10, a wireless-enabled device 12 may include a display 14 and user input mechanisms 16, which may include keypad 18, toggle disk 20, special buttons 22, microphone 24, a touch screen capable of receiving stylus inputs, some other input mechanism, and/or a combination thereof. Device 12 may also include a housing component like front panel 26 that at least partially defines an internal cavity.

As depicted in FIG. 1, device 12 also includes several engines like display engine 28, metric engine 30, priority engine 32, and mapping engine 34. Device 12 may include these engines locally, and the engines may be located within the cavity defined by front panel 26. Device 12 may also include additional engines and/or components that may support other functions and or features associated with device 12. Device 12, like other wireless-enabled devices, may have a wireless wide-area transceiver, which may be part of a multi-device platform for communicating data using radio frequency (RF) technology across a large geographic area. This platform may be a GPRS, EDGE, or 3GSM platform, for example, and may include multiple integrated circuit (IC) devices or a single IC device.

A Wireless-Enabled Device like device 12 may also have a wireless local area transceiver, which may communicate using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of one hundred feet. If the wireless local area transceiver includes an 802.11(x) transceiver, such as an 802.11(a) (b) or (g), the transceiver may have a communication range with an approximate radius of one thousand feet.

In the embodiment of FIG. 1, display engine 28 may be capable of initiating presentation of a menu like menu 36 that has several selectable items like options 38 displayed in respective menu positions. In some embodiments, metric engine 30 may track a selection metric or a group of selection metrics for one or more of options 38. The metrics being tracked may include, among others, frequency of selection, timing of selection, preceding selection, following selection, other selection metrics, and/or combinations thereof.

Priority engine 32 may be communicatively coupled to metric engine 30 and may be capable of determining a prioritization level for the individual selectable items of options 38. As depicted, OPTION 1 may have a prioritization level of 1, indicating that OPTION 1 should be displayed in the first position. Similarly, OPTION 2 may have a prioritization level of 2, indicating that OPTION 2 should be displayed in the second position.

In some embodiments, the assigned prioritization level may be modifiable and may be related to one or more selection metrics. In preferred embodiments, prioritization levels may be calculated using statistical modeling, which may apply a set of criteria and thresholds to level changes. The modeling technique may give different effect or weights to different selection metrics. An interface designer and/or a device user may not want prioritization levels to be based solely on one metric, like frequency of use. If two features have similar use patterns, their prioritization levels may switch frequently, which could cause a menu like menu 36 to change often.

As suggested above, a presented menu may change in response to a change in the prioritization level of a given selectable item. The change may occur in near real-time or may not take effect until after a user has restarted the electronic device. For example, as depicted in FIG. 1, OPTION 1 may initially have a prioritization level of 1 and, as such, justify presentation in the first position. If OPTION 1's prioritization level drops to 2 based upon some metric, OPTION 1 may maintain its first position presentation until the user turns device 12 off and then back on. Once back on, device 12 may present the user with OPTION 1 in the second position.

In preferred embodiments, device 12 may employ mapping engine 34 to help effectuate the modification of presentation levels. As depicted, mapping engine 34 may be communicatively coupled to priority engine 32 and data store 40, which may reside or be stored locally in some appropriate memory. In operation, mapping engine 34 may modify an assigned menu position for selectable items in response to changes in the prioritization level of the items.

In the embodiment of system 10, mapping engine 34 may manage a collection of linked lists located in data store 40. The linked lists may include a template 42 with fields 44 representing assignable menu positions. Fields 44 may be individually linked to selectable items, which are depicted in FIG. 1 as Adjusted OPTIONs and as being maintained in a separate list 46. By linking template 42 to list 46 with adjustable links 48, system 10 may effectively create an abstraction layer that allows mapping engine 34 to easily modify the assigned menu positions of several selectable items.

As shown, system 10 may also include a plurality of secondary selectable items identified as Adjusted SUBOPTIONS 50. The secondary selectable items may be displayable by display engine 28 and display 14 in response to receipt of a user input identifying one of the selectable items of options 38. In the embodiment represented by system 10, template 42 may be a primary template and may include fields 44 that represent assignable menu positions. As shown, OPTION 1 of fields 44 is linked to the selectable item represented as Adjusted OPTION 1. The field of list 46 containing Adjusted OPTION 1 may be linked to a secondary template 52. Secondary template 52 may include fields 54 representing dependent menu positions or menu positions that may be utilized in response to an initial user input selecting one of options 38. Operation of secondary template 52 may be similar to the implementation described above with reference to template 44 and list 46.

For example, fields 54 may be individually linked to dependent or secondary selectable items, which are depicted in FIG. 1 as Adjusted SUBOPTIONS 50 and as being maintained in a separate list 56. By linking Adjusted OPTION 1 through secondary template 52 to list 46 with adjustable links 58, system 10 may effectively create an additional abstraction layer that allows mapping engine 34 to easily modify the assigned menu positions of secondary selectable items as well. As shown in FIG. 1, secondary template 52 may include more than enough fields, and the additional fields may be linked to BLANK—telling display engine 28 that it may not need to use some of the display locations available on display 14.

In some embodiments incorporating teachings of the present disclosure, a device may present a prioritized interface by employing a computer-readable medium having computer-readable data to initiate presentation of a menu comprising a plurality of selectable items displayed in respective menu positions, to track at least one selection metric for at least one of the selectable items, to determine a prioritization level for the at least one selectable item at least partially based on the at least one selection metric, and to modify an assigned menu position for the at least one selectable item in response to a changed prioritization level for the at least one selectable item.

The computer-readable medium of a device incorporating teachings herein may include additional computer-readable data operable to maintain a template with fields representing assignable menu positions, at least one of the fields linked to the at least one selectable item, and to link the at least one selectable item to a different field in order to modify the assigned menu position for the at least one selectable item.

Figure 2:
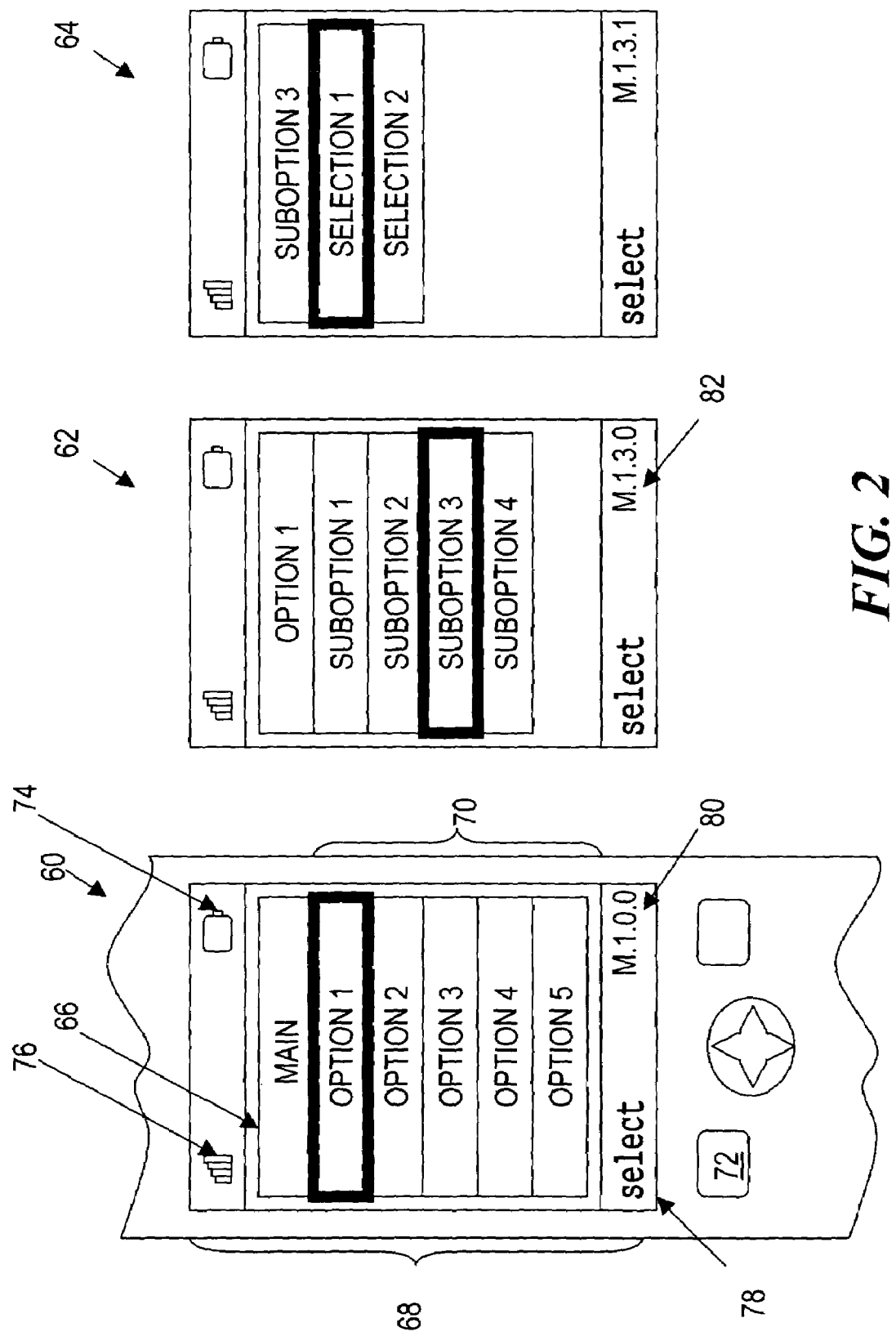
FIG. 2 shows a series of display screens presenting a user interface design incorporating teachings of the present disclosure.

Operation of a system incorporating teachings of this disclosure may be better understood by reference to FIG. 2. As mentioned above, FIG. 2 shows a series of display screens 60, 62, and 64, which present a user interface design that incorporates teachings of the present disclosure. In display 60, a user may be presented with a menu 66. Menu 66 may be presented to the user within a graphical user interface 68 of a wireless-enabled device like device 12 of FIG. 1. In other embodiments, menu 66 and teachings of this disclosure may be employed with any electronic device. For example, a computer accessing the Internet or a wireline telephone with a rich feature set.

As depicted, menu 66 may include a list of available menu options 70 displayed in respective menu or screen locations. A system like system 10 of FIG. 1 may receive a user input selecting an available menu option. As depicted, the user has selected OPTION 1 by highlighting OPTION 1 and depressing special button 72. The act of selecting OPTION 1 may advance the user to display 62, which includes a list of suboptions or secondary selectable items. The user input selecting OPTION 1 may be noted and a metric engine 30 of FIG. 1 may track a selection metric like number of selections for OPTION 1. The selection metric may be used to determine the appropriate menu location for OPTION 1. In light of the user selecting OPTION 1, a priority engine like priority engine 32 of FIG. 1 may determine that OPTION 1 is in the correct menu location.

If the priority engine does determine that the current menu location is inappropriate, a mapping engine like mapping engine 34 of FIG. 1 may remove a link associating OPTION 1 with its current location and add a link associating OPTION 1 with a modified location. Modifying the linking arrangement may result in the presentation of a modified menu—with OPTION 1 presented in a modified location.

Interface 68 may present a user with several pieces of information. For example, interface 68 may present a battery life indicator 74, a signal strength indicator 76, special button designator 78, and a current menu locator 80. Menu locator 80 may help users keep track of their current location within the menu structure of an interface. For example, in display screen 60, the user is in the top level of the menu tree, which may be designated with an "M" in locator 80. The user is also selecting the option in the first menu location, which may be designated with a "1". In display screen 62, the user is selecting suboption 3, which may be designated with a "3" in menu locator 82. Knowing the menu address presented in menu locators 80 and 82, may allow a user to jump directly to a given display screen. For example, a user may type in "M.1.3.0" and jump directly to display screen 64.

In some systems like system 10 of FIG. 1, a user may want the option of "resetting" the menus back to a factory setting. For example, a user may like having the ability to jump to a given menu by typing in a menu address. The user may not want the effectiveness of the menu addressing capabilities to be reduced by a frequently changing menu structure. As mentioned above, an interface prioritization technique that incorporates teachings of the present disclosure may customize a user interface automatically—tracking feature and option selections to determine feature screen placement and to define the customized or modifiable interface.

To facilitate "resetting" the menus, a system like system 10 may additionally store a preset display template that directly links available menu options to menu locations. In preferred embodiments, a fixed menu structure and a modifiable menu structure may be included in the same device. A user of such a device may be able to toggle between factory settings and customized settings. Some devices may also allow a user to manually customize an interface with drag and drop technique or some other display-altering mechanism. In such a device, the user may be able to toggle between three menu structures: factory settings; manually customized; and, a metric-based prioritized structure.

Figure 3:
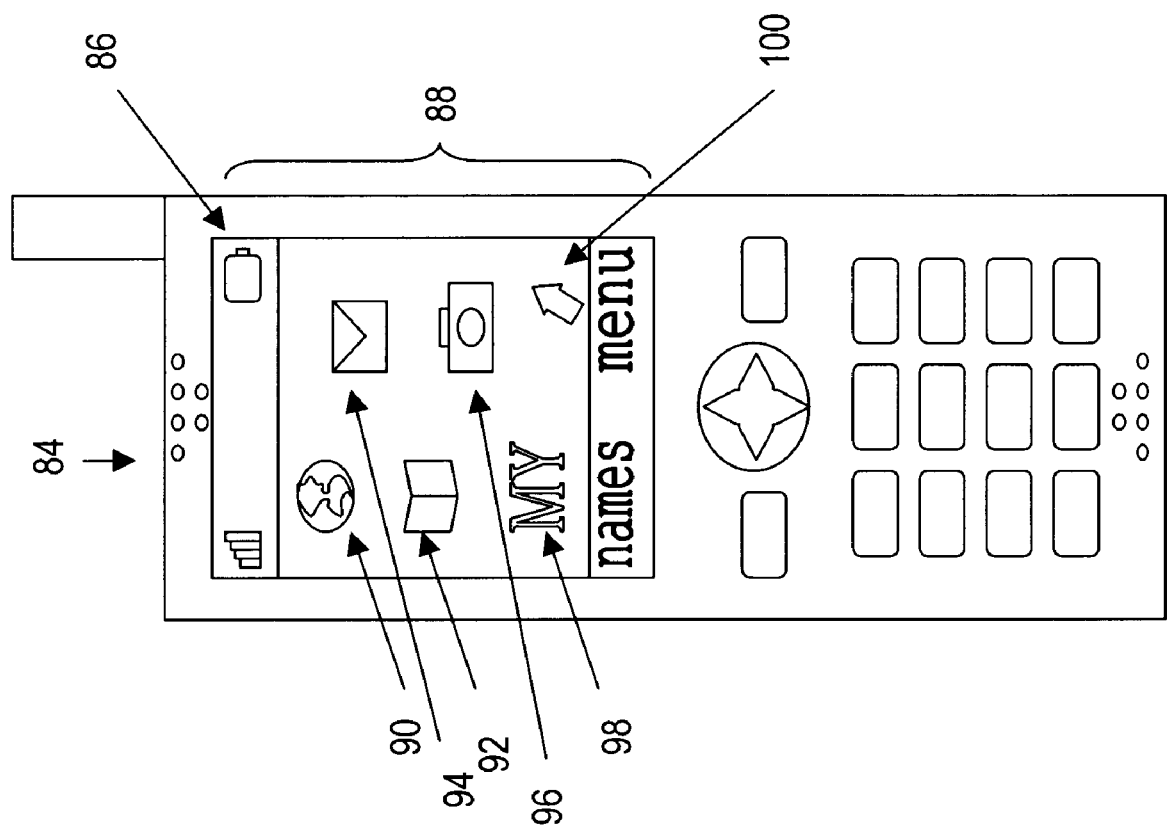
FIG. 3 depicts a wireless enabled device that incorporates teachings of the present disclosure.

As mentioned above in the brief description of the drawings, FIG. 3 depicts a wireless enabled device 84 that incorporates teachings of the present disclosure. Device 84 includes a display 86 presenting a user with a graphical user interface 88. GUI 88 includes five selectable items in respective menu locations. The five selectable items are presented as icons including web access icon 90, address book icon 92, mail icon 94, camera feature icon 96, and personal content icon 98. A user may select one of the icons with screen pointer 100.

The presented icons of FIG. 3 may represent items on the main menu. As different menu options are selected, a system like system 10 may track a selection metric and move menu items to more appropriate positions. For example, if a user of device 84 begins using text messaging more frequently, the text-messaging icon may move from under the mail icon to the main menu. If the user begins taking more pictures with device 84, camera feature icon 96 may move up to a more prominent position within the main menu.

Similarly, a user may have ten phone numbers under address book icon 92. If the tenth number is the most frequently called, the number may move from the tenth location to the first so that the user no longer needs to scroll through the other nine numbers to get to the one used most often. In other words, the user interface may change as the user's needs, preferences, and/or tendencies change.

Much like the address book and the main menu description above, web site links, which may be stored as uniform resource locators (URLs) under web access icon 90 may be auto adjusted to move the user's "favorite sites" as determined by the user's own activity to the top or higher priority menu positions.

The prioritization systems, methods, and techniques disclosed herein may be employed to improve the interface designs of many different types of devices. While the above discussion focuses on wireless-enabled devices, devices that are not wirelessly enabled may also make use of the teachings herein.

The above description also focuses on engines as one possible way of implementing some of the teachings disclosed herein. Engines may be implemented in software, firmware, hardware or some other logic and or logic/memory combination. In addition, a designer of an interface system may use something other than an engine without departing from the scope of the present invention. Systems incorporating the teachings disclosed herein will preferably allow a "laundry list" of available features to be presented on a display with limited screen size, and the "laundry list" will preferably be presented in a sequence that simplifies and expedites a user's ability to find the features the user wants.

It will be apparent to those skilled in the art that the disclosed embodiments may be modified in numerous ways and may assume many embodiments other than the particular forms specifically set out and described herein.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A prioritizing interface system comprising:
   a wireless-enabled device comprising a housing component, a display and a user input mechanism, the housing component at least partially defining an internal cavity;
   a display engine located within the internal cavity and operable to initiate presentation of a menu comprising a plurality of selectable items displayed in respective menu positions, the menu further comprising a menu locator indicating a location of a current menu within a multi-level menu structure, the menu locator including a first indicator of a position within a first level of the multi-level menu structure and including a second indicator of a position within a second level of the multi-level menu structure;
   a metric engine communicatively coupled to the user input mechanism and located within the internal cavity, the metric engine operable to track at least one selection metric for at least one of the selectable items;
   a priority engine communicatively coupled to the metric engine and located within the internal cavity, the priority engine operable to determine a prioritization level for the at least one selectable item, the prioritization level at least partially based on the at least one selection metric; and
   a mapping engine communicatively coupled to the priority engine and located within the internal cavity, the mapping engine operable to modify an assigned menu position for the at least one selectable item in response to a changed prioritization level for the at least one selectable item.

2. The system of claim 1 further comprising a plurality of secondary selectable items displayable by the display engine in response to receipt of a user input identifying the at least one selectable item, and wherein the menu locator includes a third indicator of a position within a third level of the multi-level menu structure.

3. The system of claim 2, wherein the metric engine is further operable to track a selection metric for at least one of the plurality of secondary selectable items, wherein the first indicator, the second indicator, and the third indicator are displayed as a concatenated data item having at least one delimiter between each of the first indicator, the second indicator, and the third indicator.

4. The system of claim 1, further comprising:
a memory located within the internal cavity; and
a data store resident on the memory, the data store comprising a template with fields representing assignable menu positions, at least one of the fields linked to the at least one selectable item.

5. The system of claim 4, wherein the mapping engine links the at least one selectable item to a different field to modify the assigned menu position for the at least one selectable item.

6. The system of claim 1, wherein the wireless-enabled device is selected from the group consisting of a cellular telephone, a cordless telephone, a notebook computer, an audio player, a video player, and a gaming device.

7. The system of claim 1, further comprising:
a memory located within the internal cavity;
a plurality of secondary selectable items displayable by the display engine in response to receipt of a user input identifying the at least one selectable item;
a primary template having fields representing assignable menu positions, at least one of the fields linked to the at least one selectable item, the at least one of the fields additionally linked to the secondary template;
a secondary template having fields representing dependent menu positions linked to the respective secondary selectable items; and
a data store resident on the memory, the data store comprising the primary template and the secondary template.

8. The system of claim 7, wherein the mapping engine links the at least one selectable item to a different field of the primary template to modify the assigned menu position for the at least one selectable item.

9. The system of claim 1, further comprising a preset display template linking the plurality of selectable items to fixed menu positions.

10. The prioritizing interface system of claim 1, wherein the display engine initiates presentation of the menu according to a menu address entered utilizing the user input mechanism.

11. The prioritizing interface system of claim 1, wherein the mapping engine modifies the assigned menu position for the at least one selectable item in near real-time or after the wireless-enabled device has been restarted.

12. The prioritizing interface system of claim 1, wherein the priority engine determines the prioritization level for the at least one selectable item based on different weights assigned to each of a plurality of selection metrics, and wherein the plurality of selection metrics include frequency of selection, timing of selection, preceding selection, following selection, or any combination thereof.

13. An interface prioritization method comprising:
presenting a menu within a graphical user interface of a wireless-enabled device, the menu comprising an available menu option displayed in a menu location;
receiving a user input selecting the available menu option;
tracking a selection metric for the available menu option;
using the selection metric to determine an appropriate menu location for the available menu option;
displaying the available menu option in the determined appropriate menu location in a first mode of operation when a metric-based menu display setting is selected; and
displaying the available menu option in a preset menu location in a second mode of operation when a preset display setting is selected.

14. The method of claim 13, further comprising storing a presentation template in memory local to the wireless-enabled device, the presentation template comprising fields representing assignable menu positions, wherein a first field represents the menu location and a second field represents a modified location, wherein one of the first mode of operation or the second mode of operation is selectable by a user.

15. The method of claim 14, further comprising:
removing a link associating the first field to the available menu option;
linking the available menu option to the second field; and
presenting a modified menu with the available menu option in the modified location.

16. The interface prioritization method of claim 14, wherein the user can toggle between the first mode of operation and the second mode of operation, and wherein the preset display setting of the second mode of operation is associated with one of a factory setting or a manually customized setting.

17. The method of claim 13, wherein the menu further comprises an other available menu option displayed in a different menu location, further comprising;
receiving a user input selecting the other menu option;
tracking the selection metric for the other menu option; and
using the selection metric for the other menu option to determine an appropriate menu location for the other menu option.

18. The method of claim 13, further comprising:
storing a presentation template in memory local to the wireless-enabled device, the presentation template comprising fields representing assignable menu positions, wherein a first field represents the menu location and a second field represents a modified location;
removing a link associating the first field to the available menu option;
linking the second field to the available menu option; and
additionally linking the second field to a secondary template having fields representing dependent menu positions linked to secondary selectable items depending upon the available menu option.

* * * * *